(12) United States Patent
Smith

(10) Patent No.: US 11,435,439 B2
(45) Date of Patent: Sep. 6, 2022

(54) MULTIBOUNCE TARGET MITIGATION

(71) Applicant: Waymo LLC, Mountain View, CA (US)

(72) Inventor: Larry Smith, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 459 days.

(21) Appl. No.: 16/544,836

(22) Filed: Aug. 19, 2019

(65) Prior Publication Data
US 2021/0055375 A1 Feb. 25, 2021

(51) Int. Cl.
*G01S 7/295* (2006.01)
*G01S 13/72* (2006.01)
*G01S 13/931* (2020.01)

(52) U.S. Cl.
CPC ............ *G01S 7/295* (2013.01); *G01S 13/726* (2013.01); *G01S 13/931* (2013.01); *G01S 2013/93273* (2020.01)

(58) Field of Classification Search
CPC ................... G01S 13/931; G01S 13/66–13/726
See application file for complete search history.

(56) References Cited

U.S. PATENT DOCUMENTS

| | | | | |
|---|---|---|---|---|
| 3,699,573 A | * | 10/1972 | Andrews | G01S 13/72 342/96 |
| 3,952,304 A | * | 4/1976 | Broniwitz | G01S 13/4472 342/95 |
| 4,103,847 A | * | 8/1978 | Thomas | F41G 7/20 235/412 |
| 4,272,783 A | * | 6/1981 | Warnstam | G01S 13/723 348/170 |
| 4,851,850 A | * | 7/1989 | Milan | G01S 13/72 342/90 |
| 5,184,137 A | * | 2/1993 | Pozgay | H01Q 13/106 342/174 |
| 5,374,932 A | * | 12/1994 | Wyschogrod | G08G 5/065 342/36 |
| 5,519,618 A | * | 5/1996 | Kastner | G08G 5/0026 701/120 |
| 5,801,970 A | * | 9/1998 | Rowland | G01S 3/7865 342/63 |
| 5,959,574 A | * | 9/1999 | Poore, Jr. | G01S 13/726 342/96 |

(Continued)

*Primary Examiner* — Peter M Bythrow
(74) *Attorney, Agent, or Firm* — McDonnell Boehnen Hulbert & Berghoff LLP

(57) ABSTRACT

A method is provided that includes a method is provided that includes transmitting a radar signal by a radar system. The method also includes receiving reflections of the radar signal from an environment by the radar system. Additionally, the method includes receiving a location of a plurality of objects in the environment by a radar processing system. The method further includes tracking a plurality of reflecting objects in the environment based on the received reflections by the radar processing system. Yet further, the method includes determining, by the radar processing system, that a received radar reflection corresponds to one of the plurality objects in the environment having an incorrect location. Moreover, the method includes revising a tracking for the one of the plurality objects in the environment having an incorrect location.

20 Claims, 9 Drawing Sheets

(56) References Cited

U.S. PATENT DOCUMENTS

| | | | | |
|---|---|---|---|---|
| 7,053,815 B1* | 5/2006 | Joynson | ............... | G01S 13/723 |
| | | | | 342/62 |
| 8,229,663 B2* | 7/2012 | Zeng | ................... | G01S 13/726 |
| | | | | 701/301 |
| 8,416,123 B1* | 4/2013 | Mitchell | ................ | G01S 13/42 |
| | | | | 342/107 |
| 10,732,261 B1* | 8/2020 | Wang | ..................... | G06N 3/084 |
| 2014/0028489 A1* | 1/2014 | Furukawa | .............. | G01S 13/68 |
| | | | | 342/95 |
| 2014/0055460 A1* | 2/2014 | Furukawa | ............ | G01S 13/726 |
| | | | | 345/440 |
| 2016/0109566 A1* | 4/2016 | Liu | ..................... | G01S 13/867 |
| | | | | 342/52 |
| 2017/0186185 A1* | 6/2017 | Miles | .................... | G01S 15/42 |
| 2019/0204434 A1* | 7/2019 | Novoselsky | .......... | G01S 13/723 |
| 2019/0339349 A1* | 11/2019 | Harrison | ................ | G01S 13/46 |
| 2019/0383932 A1* | 12/2019 | Flores Tapia | .......... | G01S 7/414 |
| 2020/0057155 A1* | 2/2020 | Achour | .................. | G01S 13/02 |
| 2020/0174113 A1* | 6/2020 | Lee | .......................... | B60R 1/00 |
| 2020/0191942 A1* | 6/2020 | Han | ..................... | G01S 13/931 |
| 2021/0033729 A1* | 2/2021 | Alalusi | .................. | G01S 13/32 |
| 2021/0247509 A1* | 8/2021 | Anno | ................... | G01S 13/584 |
| 2021/0302537 A1* | 9/2021 | Schlehuber | ............ | G01S 13/91 |
| 2021/0302570 A1* | 9/2021 | Ichiki | .................... | G01S 13/86 |

\* cited by examiner

MULTIBOUNCE TARGET MITIGATION

BACKGROUND

Radio detection and ranging (RADAR) systems can be used to actively estimate range, angle, and/or Doppler frequency shift to environmental features by emitting radio signals and detecting returning reflected signals. Distances to radio-reflective features can be determined according to the time delay between transmission and reception. The radar system can emit a signal that varies in frequency over time, such as a signal with a time-varying frequency ramp, and then relate the difference in frequency between the emitted signal and the reflected signal to a range estimate. Some systems may also estimate relative motion of reflective objects based on Doppler frequency shifts in the received reflected signals.

In some examples, directional antennas can be used for the transmission and/or reception of signals to associate each range estimate with a bearing. More generally, directional antennas can also be used to focus radiated energy on a given field of view of interest. Combining the measured distances and the directional information allows for the surrounding environment features to be mapped. In other examples, non-directional antennas can be alternatively used. In these examples, a receiving antenna may have a 90 degree field of view, and may be configured to utilize multiple channels with a phase offset to determine angle of arrival of the received signal. Thus, the radar sensor can be used, for instance, by an autonomous vehicle control system to avoid obstacles indicated by the sensor information. Some example automotive radar systems may be configured to operate at an electromagnetic wave frequency range of 76-77 Giga-Hertz (GHz). These radar systems may use transmission antennas that can to focus the radiated energy into tight beams in order to enable receiving antennas (e.g., having wide angle beams) in the radar system to measure an environment of the vehicle with high accuracy.

SUMMARY

In one example, a radar system is provided. The radar system includes a radar unit configured to transmit a radar signal and receive radar reflections. The radar system also includes a memory configured to store data related to an environment. The radar system also includes a radar processing system. The radar processing system is configured to receive a location of a plurality of objects in the environment. The radar processing system is also configured to track a plurality of reflecting objects in the environment based on the received reflections. The radar system is further configured to determine that a received radar reflection corresponds to one of the plurality objects in the environment having an incorrect location. Additionally, the radar system is configured to revise a tracking for the one of the plurality objects in the environment having an incorrect location.

In another example, a method is provided that includes transmitting a radar signal by a radar system. The method also includes receiving reflections of the radar signal from an environment by the radar system. Additionally, the method includes receiving a location of a plurality of objects in the environment by a radar processing system. The method further includes tracking a plurality of reflecting objects in the environment based on the received reflections by the radar processing system. Yet further, the method includes determining, by the radar processing system, that a received radar reflection corresponds to one of the plurality objects in the environment having an incorrect location. Moreover, the method includes revising a tracking for the one of the plurality objects in the environment having an incorrect location.

In yet another example, a non-transitory computer readable medium having stored thereon executable instructions that, upon execution by a computing device, cause the computing device to perform functions is provided. The functions include causing the transmission of a radar signal by a radar system. The functions also include receiving reflections of the radar signal from an environment by the radar system. Additionally, the functions include receiving a location of a plurality of objects in the environment by a radar processing system. The functions further include tracking a plurality of reflecting objects in the environment based on the received reflections by the radar processing system. Moreover, the functions include determine that a received radar reflection corresponds to one of the plurality objects in the environment having an incorrect location by the radar processing system. The functions also include revising a tracking for the one of the plurality objects in the environment having an incorrect location.

In still another example, a system is provided that includes a means for transmitting a radar signal by a radar system. The system also includes a means for receiving reflections of the radar signal from an environment by the radar system. Additionally, the system includes a means for receiving a location of a plurality of objects in the environment by a radar processing system. The system further includes a means for tracking a plurality of reflecting objects in the environment based on the received reflections by the radar processing system. Yet further, the system includes a means for determining that a received radar reflection corresponds to one of the plurality objects in the environment having an incorrect location. Moreover, the system includes a means for revising a tracking for the one of the plurality objects in the environment having an incorrect location.

These as well as other aspects, advantages, and alternatives, will become apparent to those of ordinary skill in the art by reading the following detailed description, with reference where appropriate to the accompanying figures.

DETAILED DESCRIPTION

Figure 1:
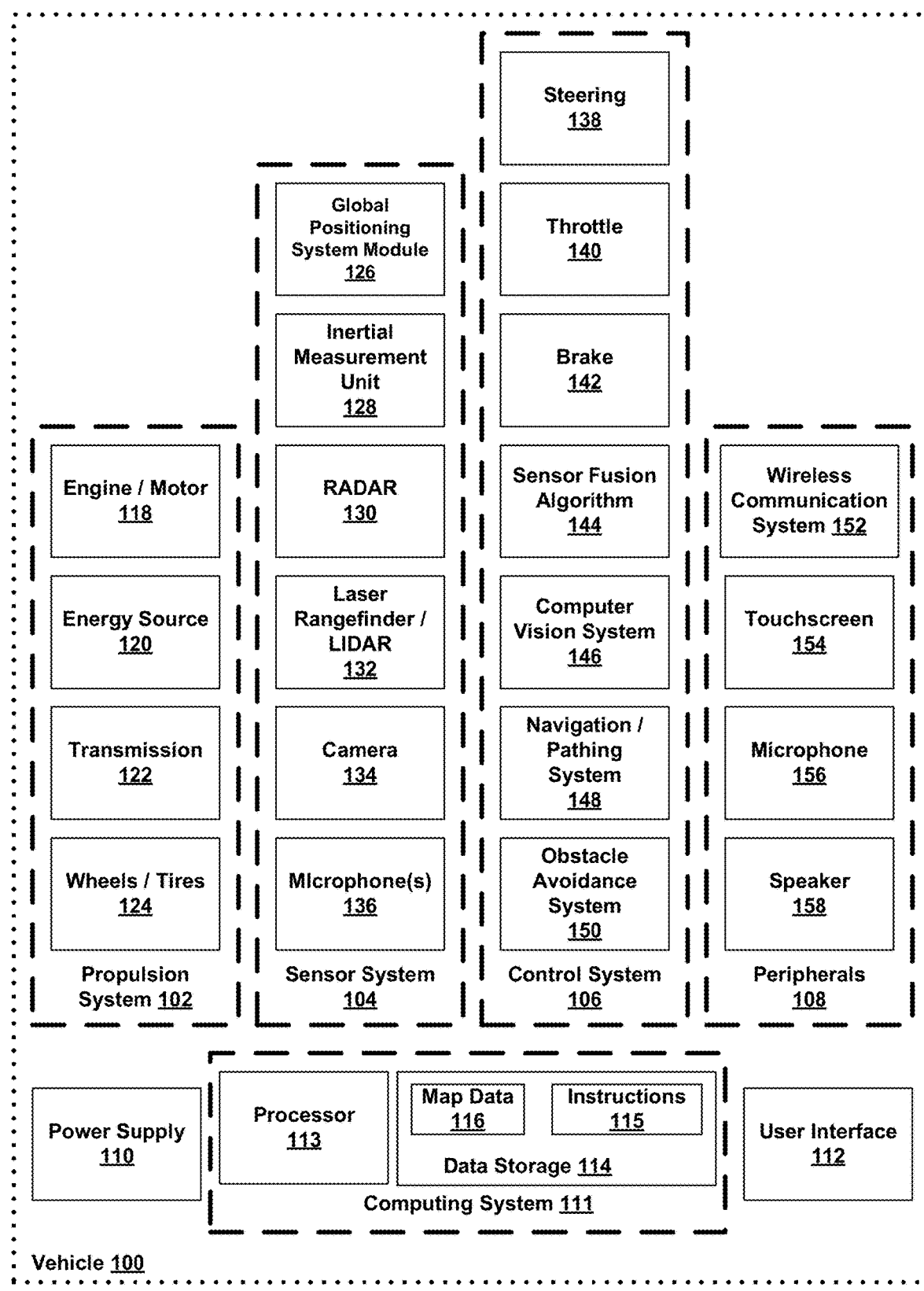
FIG. 1 is a functional block diagram depicting aspects of an example autonomous vehicle.

The following detailed description describes various features and functions of the disclosed systems and methods with reference to the accompanying figures. In the figures, similar symbols identify similar components, context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

Continued efforts to improve vehicle safety include the development of autonomous vehicles equipped with accident-avoidance systems that may have the ability to avoid accidents. Various sensors, such as radio detection and ranging (RADAR) sensors and light detection and ranging (LIDAR) sensors among other possibilities, may be included as part of an autonomous vehicle to detect obstacles and/or other vehicles in an environment of the autonomous vehicle and thereby facilitate accident avoidance. However, recent advancements may enable sensor range and power to increase beyond the power and range of traditional automotive sensors. Thus, due to the increased power (and associated increase range), the sensors may be more susceptible to multipath (i.e., inadvertent reflected signals) in some situations. The present disclosure is directed toward multipath of sensors.

In practice, during the operation of a radar system, a reflector (e.g., such as an overhead roadway sign, large building, etc.) within the environment may cause multi-bounce signal to form part of the radar reflection signals. Multibounce is when a radar pulse reflects off multiple objects (e.g., a first and a second object) before returning to the radar unit. For example, during operation of a radar system on a highway or a similar environment, a radar signal transmitted from a vehicle may bounce off an overhead sign and then subsequently off of another vehicle before bouncing back off of the sign again prior to reaching the original vehicle that initially transmitted the radar signal. In such a scenario, a conventional radar system may fail to identify that the radar signal bounced multiple times prior to reaching the radar system as well as where each reflection likely occurred. Rather, the conventional system might misidentify the reflected signals as originating from an object that appears to be located on the other side of the object that actually caused one or more of the reflections. This misidentification may cause the radar signal processing system to produce inaccurate measurements of the environment. For instance, any vehicles traveling nearby and in the same direction as the transmitting vehicle may appear as if they are traveling towards the transmitting vehicle rather than in the same direction as a result of a conventional radar system misidentifying multibounce radar signals.

To overcome potential problems in multibounce scenarios, a radar processing system associated with a radar system may use information known to the transmitting vehicle, such as the positions of nearby vehicles and/or map data, when processing received reflections of radar signals. The radar processing system may receive this information from various sources, such as prior radar measurements, sensor data from other sensors, via wireless communication with other vehicles, and/or other sources (e.g., map databases). Particularly, the information may be used to determine that already identified or known objects in the environment (e.g., nearby vehicles and overhead signs) caused the received reflections of signals. By determining that the reflections are caused by known objects, the system may be able to correctly associate and assign the reflection signals to the correct objects. Thus, by using this technique, the radar processing system is able to reorient and/or remove the reflection signals and remove the locations of false positive detections. Further, the radar processing system may also be able to characterize the main reflecting object based on the determinations made about the known objects detected in reflections.

Thus, in some instances, the radar processing system may determine and monitor respective radar locations of multiple objects in the surrounding environment. The radar processing system may also obtain information specifying actual locations for one or more of these objects from one or more sources (e.g., sensors, databases, wireless communication). The radar processing system may also perform a comparison between radar locations and actual locations of the objects. When the comparison yields a difference between the location of an object as specified by radar and as specified by one or more other sources, the radar processing system may adjust the radar location for an object. In some instances, the radar processing system may perform this comparison process iteratively to continuously calibrate the location of objects as specified by radar with the locations provided by other sources.

Additionally, some radar systems may operate with high resolution in both Doppler and range, while having low resolution in azimuth. In other examples, a different combination of high and low resolution may be possible for doppler, range, and azimuth. In practice, the radar processing system of the present disclosure may detect and use multibounce to refine measurements of reflecting objects. For instance, a vehicle may be able to directly image another vehicle located nearby. This direct measurement of the nearby vehicle may have high resolution in both Doppler and range and low resolution in azimuth. Thus, the radar system of the vehicle may be able to accurately measure the range and Doppler of the other vehicle.

By using radar signals that perform a multibounce prior to reaching the radar system, the same vehicle may be imaged by the radar system from another angle (i.e., from the direction by which the reflected radar signal hits the other vehicle). The multibounce radar signal may have high resolution in both Doppler and range and low resolution in azimuth. Conveniently, because the other vehicle is being imaged from another direction, the low-resolution azimuth measurement of the direct radar measurement may be supplemented with higher resolution range information from the reflected radar signal. Therefore, the radar imaging of the other vehicle may be improved through radar imaging from two different directions.

The embodiments disclosed herein may be used on any type of vehicle, including conventional automobiles and automobiles having an autonomous mode of operation. However, the term "vehicle" is to be broadly construed to cover any moving object, including, for instance, a truck, a van, a semitrailer truck, a motorcycle, a golf cart, an off-road vehicle, a warehouse transport vehicle, or a farm vehicle, as well as a carrier that rides on a track such as a rollercoaster, trolley, tram, or train car, among other examples. Furthermore, although example vehicles are shown and described as vehicles that may be configured to operate in autonomous mode, the embodiments described herein are also applicable to vehicles that are not configured to operate autonomously. Thus, the example vehicles are not meant to limit the present disclosure to autonomous vehicles.

FIG. 1 is a functional block diagram illustrating a vehicle 100 according to an example embodiment. The vehicle 100 is configured to operate fully or partially in an autonomous mode, and thus may be referred to as an "autonomous vehicle." For example, a computer system 112 can control the vehicle 100 while in an autonomous mode via control instructions to a control system 106 for the vehicle 100. The computer system 112 can receive information from one or more sensor systems 104 and can base one or more control processes (such as setting a heading so as to avoid a detected obstacle) upon the received information in an automated fashion.

The autonomous vehicle 100 can be fully autonomous or partially autonomous. In a partially autonomous vehicle some functions can optionally be manually controlled (e.g., by a driver) some or all of the time. Further, a partially autonomous vehicle can be configured to switch between a fully-manual operation mode (i.e., controlled by a driver) and a partially-autonomous and/or a fully-autonomous operation mode.

The vehicle 100 includes a propulsion system 102, a sensor system 104, a control system 106, one or more peripherals 108, a power supply 110, a computer system 112, and a user interface 116. The vehicle 100 may include more or fewer subsystems and each subsystem can optionally include multiple components. Further, each of the subsystems and components of vehicle 100 can be interconnected and/or in communication. Thus, one or more of the functions of the vehicle 100 described herein can optionally be divided between additional functional or physical components, or combined into fewer functional or physical components. In some further examples, additional functional and/or physical components may be added to the examples illustrated by FIG. 1.

The propulsion system 102 can include components operable to provide powered motion to the vehicle 100. In some embodiments the propulsion system 102 includes an engine/motor 118, an energy source 119, a transmission 120, and wheels/tires 121. The engine/motor 118 converts energy source 119 to mechanical energy. In some embodiments, the propulsion system 102 can optionally include one or both of engines and/or motors. For example, a gas-electric hybrid vehicle can include both a gasoline/diesel engine and an electric motor.

The energy source 119 represents a source of energy, such as electrical and/or chemical energy, that may, in full or in part, power the engine/motor 118. That is, the engine/motor 118 can be configured to convert the energy source 119 to mechanical energy to operate the transmission. In some embodiments, the energy source 119 can include gasoline, diesel, other petroleum-based fuels, propane, other compressed gas-based fuels, ethanol, solar panels, batteries, capacitors, flywheels, regenerative braking systems, and/or other sources of electrical power, etc. The energy source 119 can also provide energy for other systems of the vehicle 100.

The transmission 120 includes appropriate gears and/or mechanical elements suitable to convey the mechanical power from the engine/motor 118 to the wheels/tires 121. In some embodiments, the transmission 120 includes a gearbox, a clutch, a differential, a drive shaft, and/or axle(s), etc.

The wheels/tires 121 are arranged to stably support the vehicle 100 while providing frictional traction with a surface, such as a road, upon which the vehicle 100 moves. Accordingly, the wheels/tires 121 are configured and arranged according to the nature of the vehicle 100. For example, the wheels/tires can be arranged as a unicycle, bicycle, motorcycle, tricycle, or car/truck four-wheel format. Other wheel/tire geometries are possible, such as those including six or more wheels. Any combination of the wheels/tires 121 of vehicle 100 may be operable to rotate differentially with respect to other wheels/tires 121. The wheels/tires 121 can optionally include at least one wheel that is rigidly attached to the transmission 120 and at least one tire coupled to a rim of a corresponding wheel that makes contact with a driving surface. The wheels/tires 121 may include any combination of metal and rubber, and/or other materials or combination of materials.

The sensor system 104 generally includes one or more sensors configured to detect information about the environment surrounding the vehicle 100. For example, the sensor system 104 can include a Global Positioning System (GPS) 122, an inertial measurement unit (IMU) 124, a RADAR unit 126, a laser rangefinder/LIDAR unit 128, a camera 130, and/or a microphone 131. The sensor system 104 could also include sensors configured to monitor internal systems of the vehicle 100 (e.g., 02 monitor, fuel gauge, engine oil temperature, wheel speed sensors, etc.). One or more of the sensors included in sensor system 104 could be configured to be actuated separately and/or collectively in order to modify a position and/or an orientation of the one or more sensors.

The GPS 122 is a sensor configured to estimate a geographic location of the vehicle 100. To this end, GPS 122 can include a transceiver operable to provide information regarding the position of the vehicle 100 with respect to the Earth.

The IMU 124 can include any combination of sensors (e.g., accelerometers and gyroscopes) configured to sense position and orientation changes of the vehicle 100 based on inertial acceleration.

The RADAR unit 126 can represent a system that utilizes radio signals to sense objects within the local environment of the vehicle 100. In some embodiments, in addition to sensing the objects, the RADAR unit 126 and/or the computer system 112 can additionally be configured to sense the speed and/or heading of the objects.

Similarly, the laser rangefinder or LIDAR unit 128 can be any sensor configured to sense objects in the environment in which the vehicle 100 is located using lasers. The laser rangefinder/LIDAR unit 128 can include one or more laser sources, a laser scanner, and one or more detectors, among other system components. The laser rangefinder/LIDAR unit 128 can be configured to operate in a coherent (e.g., using heterodyne detection) or an incoherent detection mode.

The camera 130 can include one or more devices configured to capture a plurality of images of the environment surrounding the vehicle 100. The camera 130 can be a still camera or a video camera. In some embodiments, the camera 130 can be mechanically movable such as by rotating and/or tilting a platform to which the camera is mounted. As such, a control process of vehicle 100 may be implemented to control the movement of camera 130.

The sensor system 104 can also include a microphone 131. The microphone 131 can be configured to capture sound from the environment surrounding vehicle 100. In some cases, multiple microphones can be arranged as a microphone array, or possibly as multiple microphone arrays.

The control system 106 is configured to control operation(s) regulating acceleration of the vehicle 100 and its components. To effect acceleration, the control system 106 includes a steering unit 132, throttle 134, brake unit 136, a sensor fusion algorithm 138, a computer vision system 140, a navigation/pathing system 142, and/or an obstacle avoidance system 144, etc.

The steering unit 132 is operable to adjust the heading of vehicle 100. For example, the steering unit can adjust the axis (or axes) of one or more of the wheels/tires 121 so as to effect turning of the vehicle. The throttle 134 is configured to control, for instance, the operating speed of the engine/motor 118 and, in turn, adjust forward acceleration of the vehicle 100 via the transmission 120 and wheels/tires 121. The brake unit 136 decelerates the vehicle 100. The brake unit 136 can use friction to slow the wheels/tires 121. In some embodiments, the brake unit 136 inductively decelerates the wheels/tires 121 by a regenerative braking process to convert kinetic energy of the wheels/tires 121 to electric current.

The sensor fusion algorithm 138 is an algorithm (or a computer program product storing an algorithm) configured to accept data from the sensor system 104 as an input. The data may include, for example, data representing information sensed at the sensors of the sensor system 104. The sensor fusion algorithm 138 can include, for example, a Kalman filter, Bayesian network, etc. The sensor fusion algorithm 138 provides assessments regarding the environment surrounding the vehicle based on the data from sensor system 104. In some embodiments, the assessments can include evaluations of individual objects and/or features in the environment surrounding vehicle 100, evaluations of particular situations, and/or evaluations of possible interference between the vehicle 100 and features in the environment (e.g., such as predicting collisions and/or impacts) based on the particular situations.

The computer vision system 140 can process and analyze images captured by camera 130 to identify objects and/or features in the environment surrounding vehicle 100. The detected features/objects can include traffic signals, roadway boundaries, other vehicles, pedestrians, and/or obstacles, etc. The computer vision system 140 can optionally employ an object recognition algorithm, a Structure From Motion (SFM) algorithm, video tracking, and/or available computer vision techniques to effect categorization and/or identification of detected features/objects. In some embodiments, the computer vision system 140 can be additionally configured to map the environment, track perceived objects, estimate the speed of objects, etc.

The navigation and pathing system 142 is configured to determine a driving path for the vehicle 100. For example, the navigation and pathing system 142 can determine a series of speeds and directional headings to effect movement of the vehicle along a path that substantially avoids perceived obstacles while generally advancing the vehicle along a roadway-based path leading to an ultimate destination, which can be set according to user inputs via the user interface 116, for example. The navigation and pathing system 142 can additionally be configured to update the driving path dynamically while the vehicle 100 is in operation on the basis of perceived obstacles, traffic patterns, weather/road conditions, etc. In some embodiments, the navigation and pathing system 142 can be configured to incorporate data from the sensor fusion algorithm 138, the GPS 122, and one or more predetermined maps so as to determine the driving path for vehicle 100.

The obstacle avoidance system 144 can represent a control system configured to identify, evaluate, and avoid or otherwise negotiate potential obstacles in the environment surrounding the vehicle 100. For example, the obstacle avoidance system 144 can effect changes in the navigation of the vehicle by operating one or more subsystems in the control system 106 to undertake swerving maneuvers, turning maneuvers, braking maneuvers, etc. In some embodiments, the obstacle avoidance system 144 is configured to automatically determine feasible ("available") obstacle avoidance maneuvers on the basis of surrounding traffic patterns, road conditions, etc. For example, the obstacle avoidance system 144 can be configured such that a swerving maneuver is not undertaken when other sensor systems detect vehicles, construction barriers, other obstacles, etc. in the region adjacent the vehicle that would be swerved into. In some embodiments, the obstacle avoidance system 144 can automatically select the maneuver that is both available and maximizes safety of occupants of the vehicle. For example, the obstacle avoidance system 144 can select an avoidance maneuver predicted to cause the least amount of acceleration in a passenger cabin of the vehicle 100.

The vehicle 100 also includes peripherals 108 configured to allow interaction between the vehicle 100 and external sensors, other vehicles, other computer systems, and/or a user, such as an occupant of the vehicle 100. For example, the peripherals 108 for receiving information from occupants, external systems, etc. can include a wireless communication system 146, a touchscreen 148, a microphone 150, and/or a speaker 152.

In some embodiments, the peripherals 108 function to receive inputs for a user of the vehicle 100 to interact with the user interface 116. To this end, the touchscreen 148 can both provide information to a user of vehicle 100, and convey information from the user indicated via the touchscreen 148 to the user interface 116. The touchscreen 148 can be configured to sense both touch positions and touch gestures from a user's finger (or stylus, etc.) via capacitive sensing, resistance sensing, optical sensing, a surface acoustic wave process, etc. The touchscreen 148 can be capable of sensing finger movement in a direction parallel or planar to the touchscreen surface, in a direction normal to the touchscreen surface, or both, and may also be capable of sensing a level of pressure applied to the touchscreen surface. An occupant of the vehicle 100 can also utilize a voice command interface. For example, the microphone 150 can be configured to receive audio (e.g., a voice command or other audio input) from a user of the vehicle 100. Similarly, the speakers 152 can be configured to output audio to the user of the vehicle 100.

In some embodiments, the peripherals 108 function to allow communication between the vehicle 100 and external systems, such as devices, sensors, other vehicles, etc. within its surrounding environment and/or controllers, servers, etc., physically located far from the vehicle that provide useful information regarding the vehicle's surroundings, such as traffic information, weather information, etc. For example, the wireless communication system 146 can wirelessly communicate with one or more devices directly or via a communication network. The wireless communication system 146 can optionally use 3G cellular communication, such as Code-Division Multiple Access (CDMA), Evolution-Data Optimized (EV-DO), Global System for Mobile communications (GSM)/General Packet Radio Surface (GPRS), and/or 4G cellular communication, such as Worldwide Interoperability for Microwave Access (WiMAX) or Long-Term Evolution (LTE). Additionally or alternatively, wireless communication system 146 can communicate with a wireless local area network (WLAN), for example, using WiFi. In some embodiments, wireless communication system 146 could communicate directly with a device, for example, using an infrared link, Bluetooth®, and/or Zig-Bee®. The wireless communication system 146 can include one or more dedicated short-range communication (DSRC) devices that can include public and/or private data communications between vehicles and/or roadside stations. Other wireless protocols for sending and receiving information embedded in signals, such as various vehicular communication systems, can also be employed by the wireless communication system 146 within the context of the present disclosure.

As noted above, the power supply 110 can provide power to components of vehicle 100, such as electronics in the peripherals 108, computer system 112, sensor system 104, etc. The power supply 110 can include a rechargeable lithium-ion or lead-acid battery for storing and discharging electrical energy to the various powered components, for example. In some embodiments, one or more banks of batteries can be configured to provide electrical power. In some embodiments, the power supply 110 and energy source 119 can be implemented together, as in some all-electric cars.

Many or all of the functions of vehicle 100 can be controlled via computer system 112 that receives inputs from the sensor system 104, peripherals 108, etc., and communicates appropriate control signals to the propulsion system 102, control system 106, peripherals 108, etc. to effect automatic operation of the vehicle 100 based on its surroundings. Computer system 112 includes at least one processor 113 (which can include at least one microprocessor) that executes instructions 115 stored in a non-transitory computer readable medium, such as the data storage 114. The computer system 112 may also represent a plurality of computing devices that serve to control individual components or subsystems of the vehicle 100 in a distributed fashion.

In some embodiments, data storage 114 contains instructions 115 (e.g., program logic) executable by the processor 113 to execute various functions of vehicle 100, including those described above in connection with FIG. 1. Data storage 114 may contain additional instructions as well, including instructions to transmit data to, receive data from, interact with, and/or control one or more of the propulsion system 102, the sensor system 104, the control system 106, and the peripherals 108.

In addition to the instructions 115, the data storage 114 may store data such as roadway maps, path information, among other information. Such information may be used by vehicle 100 and computer system 112 during operation of the vehicle 100 in the autonomous, semi-autonomous, and/or manual modes to select available roadways to an ultimate destination, interpret information from the sensor system 104, etc.

The vehicle 100, and associated computer system 112, provides information to and/or receives input from, a user of vehicle 100, such as an occupant in a passenger cabin of the vehicle 100. The user interface 116 can accordingly include one or more input/output devices within the set of peripherals 108, such as the wireless communication system 146, the touchscreen 148, the microphone 150, and/or the speaker 152 to allow communication between the computer system 112 and a vehicle occupant.

The computer system 112 controls the operation of the vehicle 100 based on inputs received from various subsystems indicating vehicle and/or environmental conditions (e.g., propulsion system 102, sensor system 104, and/or control system 106), as well as inputs from the user interface 116, indicating user preferences. For example, the computer system 112 can utilize input from the control system 106 to control the steering unit 132 to avoid an obstacle detected by the sensor system 104 and the obstacle avoidance system 144. The computer system 112 can be configured to control many aspects of the vehicle 100 and its subsystems. Generally, however, provisions are made for manually overriding automated controller-driven operation, such as in the event of an emergency, or merely in response to a user-activated override, etc.

The components of vehicle 100 described herein can be configured to work in an interconnected fashion with other components within or outside their respective systems. For example, the camera 130 can capture a plurality of images that represent information about an environment of the vehicle 100 while operating in an autonomous mode. The environment may include other vehicles, traffic lights, traffic signs, road markers, pedestrians, etc. The computer vision system 140 can categorize and/or recognize various aspects in the environment in concert with the sensor fusion algorithm 138, the computer system 112, etc. based on object recognition models pre-stored in data storage 114, and/or by other techniques.

Although the vehicle 100 is described and shown in FIG. 1 as having various components of vehicle 100, e.g., wireless communication system 146, computer system 112, data storage 114, and user interface 116, integrated into the vehicle 100, one or more of these components can optionally be mounted or associated separately from the vehicle 100. For example, data storage 114 can exist, in part or in full, separate from the vehicle 100, such as in a cloud-based server, for example. Thus, one or more of the functional elements of the vehicle 100 can be implemented in the form of device elements located separately or together. The functional device elements that make up vehicle 100 can generally be communicatively coupled together in a wired and/or wireless fashion.

Figure 2A:
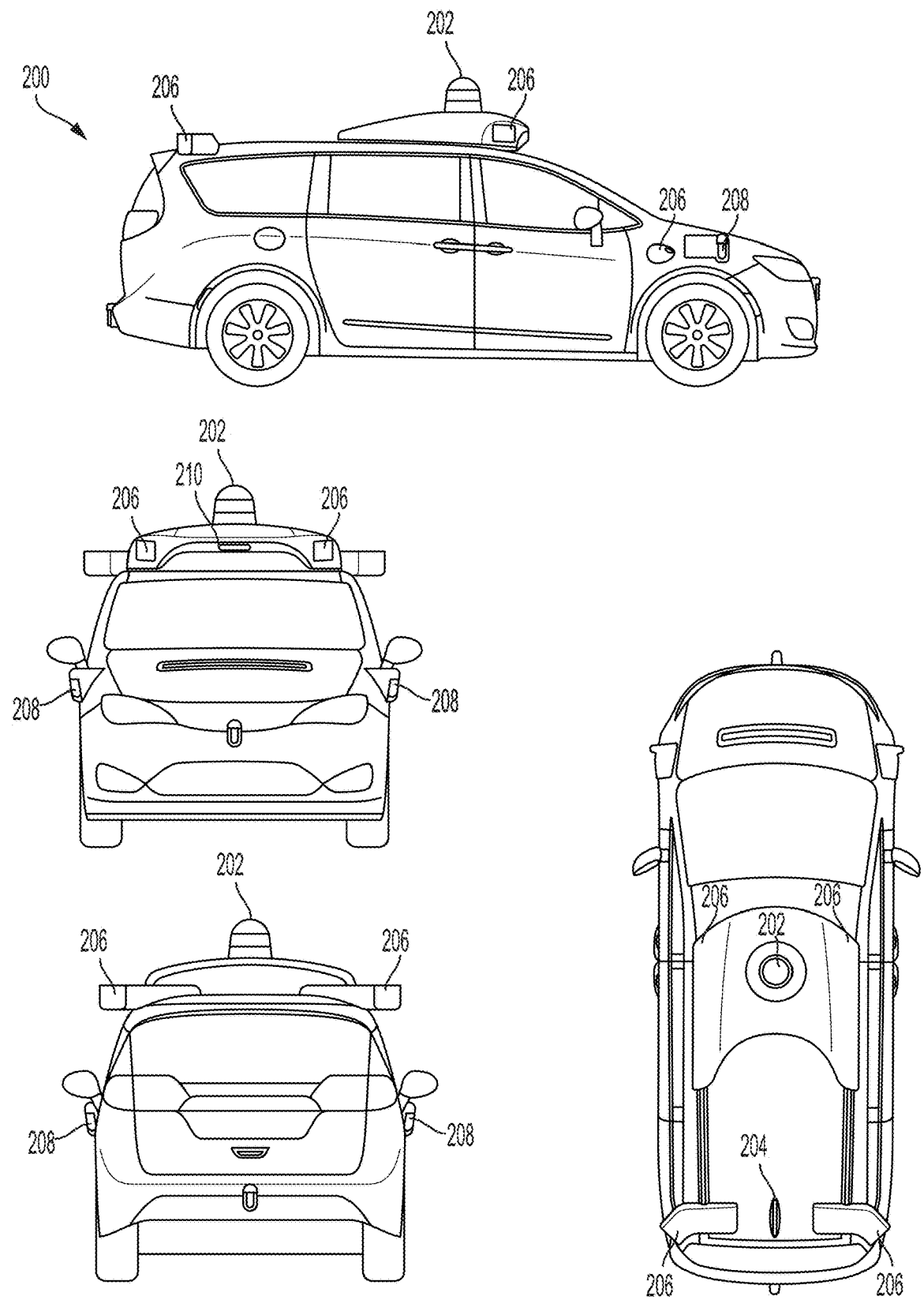
FIG. 2A depicts exterior views of an example autonomous vehicle.

FIG. 2A shows an example vehicle 200 that can include some or all of the functions described in connection with vehicle 100 in reference to FIG. 1. In particular, FIG. 2A shows various different views of vehicle 200. Although vehicle 200 is illustrated in FIG. 2A as a four-wheel van-type car for illustrative purposes, the present disclosure is not so limited. For instance, the vehicle 200 can represent a truck, a van, a semi-trailer truck, a motorcycle, a golf cart, an off-road vehicle, or a farm vehicle, etc.

The example vehicle 200 includes a sensor unit 202, a wireless communication system 204, RADAR units 206, laser rangefinder units 208, and a camera 210. Furthermore, the example vehicle 200 can include any of the components described in connection with vehicle 100 of FIG. 1. The RADAR unit 206 and/or laser rangefinder unit 208 can actively scan the surrounding environment for the presence of potential obstacles and can be similar to the RADAR unit 126 and/or laser rangefinder/LIDAR unit 128 in the vehicle 100.

The sensor unit 202 is mounted atop the vehicle 200 and includes one or more sensors configured to detect information about an environment surrounding the vehicle 200, and output indications of the information. For example, sensor unit 202 can include any combination of cameras, RADARs, LIDARs, range finders, and acoustic sensors. The sensor unit 202 can include one or more movable mounts that could be operable to adjust the orientation of one or more sensors in the sensor unit 202. In one embodiment, the movable mount could include a rotating platform that could scan sensors so as to obtain information from each direction around the vehicle 200. In another embodiment, the movable mount of the sensor unit 202 could be moveable in a scanning fashion within a particular range of angles and/or azimuths. The sensor unit 202 could be mounted atop the roof of a car, for instance, however other mounting locations are possible. Additionally, the sensors of sensor unit 202 could be distributed in different locations and need not be collocated in a single location. Some possible sensor types and mounting locations include RADAR unit 206 and laser rangefinder unit 208. Furthermore, each sensor of sensor unit 202 can be configured to be moved or scanned independently of other sensors of sensor unit 202.

In an example configuration, one or more RADAR scanners (e.g., the RADAR unit 206) can be located near the front of the vehicle 200, to actively scan the region in front of the car 200 for the presence of radio-reflective objects. A RADAR scanner can be situated, for example, in a location suitable to illuminate a region including a forward-moving path of the vehicle 200 without occlusion by other features of the vehicle 200. For example, a RADAR scanner can be situated to be embedded and/or mounted in or near the front bumper, front headlights, cowl, and/or hood, etc. Furthermore, one or more additional RADAR scanning devices can be located to actively scan the side and/or rear of the vehicle 200 for the presence of radio-reflective objects, such as by including such devices in or near the rear bumper, side panels, rocker panels, and/or undercarriage, etc.

The wireless communication system 204 could be located on the roof of the vehicle 200 as depicted in FIG. 2A. Alternatively, the wireless communication system 204 could be located, fully or in part, elsewhere. The wireless communication system 204 may include wireless transmitters and receivers that could be configured to communicate with devices external or internal to the vehicle 200. Specifically, the wireless communication system 204 could include transceivers configured to communicate with other vehicles and/or computing devices, for instance, in a vehicular communication system or a roadway station. Examples of such vehicular communication systems include dedicated short range communications (DSRC), radio frequency identification (RFID), and other proposed communication standards directed towards intelligent transport systems.

The camera 210 can be a photo-sensitive instrument, such as a still camera, a video camera, etc. that is configured to capture a plurality of images of the environment of the vehicle 200. To this end, the camera 210 can be configured to detect visible light, and can additionally or alternatively be configured to detect light from other portions of the spectrum, such as infrared or ultraviolet light. The camera 210 can be a two-dimensional detector, and can optionally have a three-dimensional spatial range of sensitivity. In some embodiments, the camera 210 can include, for example, a range detector configured to generate a two-dimensional image indicating distance from the camera 210 to a number of points in the environment. To this end, the camera 210 may use one or more range detecting techniques.

For example, the camera 210 can provide range information by using a structured light technique in which the vehicle 200 illuminates an object in the environment with a predetermined light pattern, such as a grid or checkerboard pattern and uses the camera 210 to detect a reflection of the predetermined light pattern from environmental surroundings. Based on distortions in the reflected light pattern, the vehicle 200 can determine the distance to the points on the object. The predetermined light pattern may comprise infrared light or radiation at other suitable wavelengths for such measurements.

The camera 210 can be mounted inside a front windshield of the vehicle 200. Specifically, the camera 210 can be situated to capture images from a forward-looking view with respect to the orientation of the vehicle 200. Other mounting locations and viewing angles of camera 210 can also be used, either inside or outside the vehicle 200. Further, the camera 210 can have associated optics operable to provide an adjustable field of view. Further, the camera 210 can be mounted to vehicle 200 with a movable mount to vary a pointing angle of the camera 210, such as via a pan/tilt mechanism.

Figure 2B:
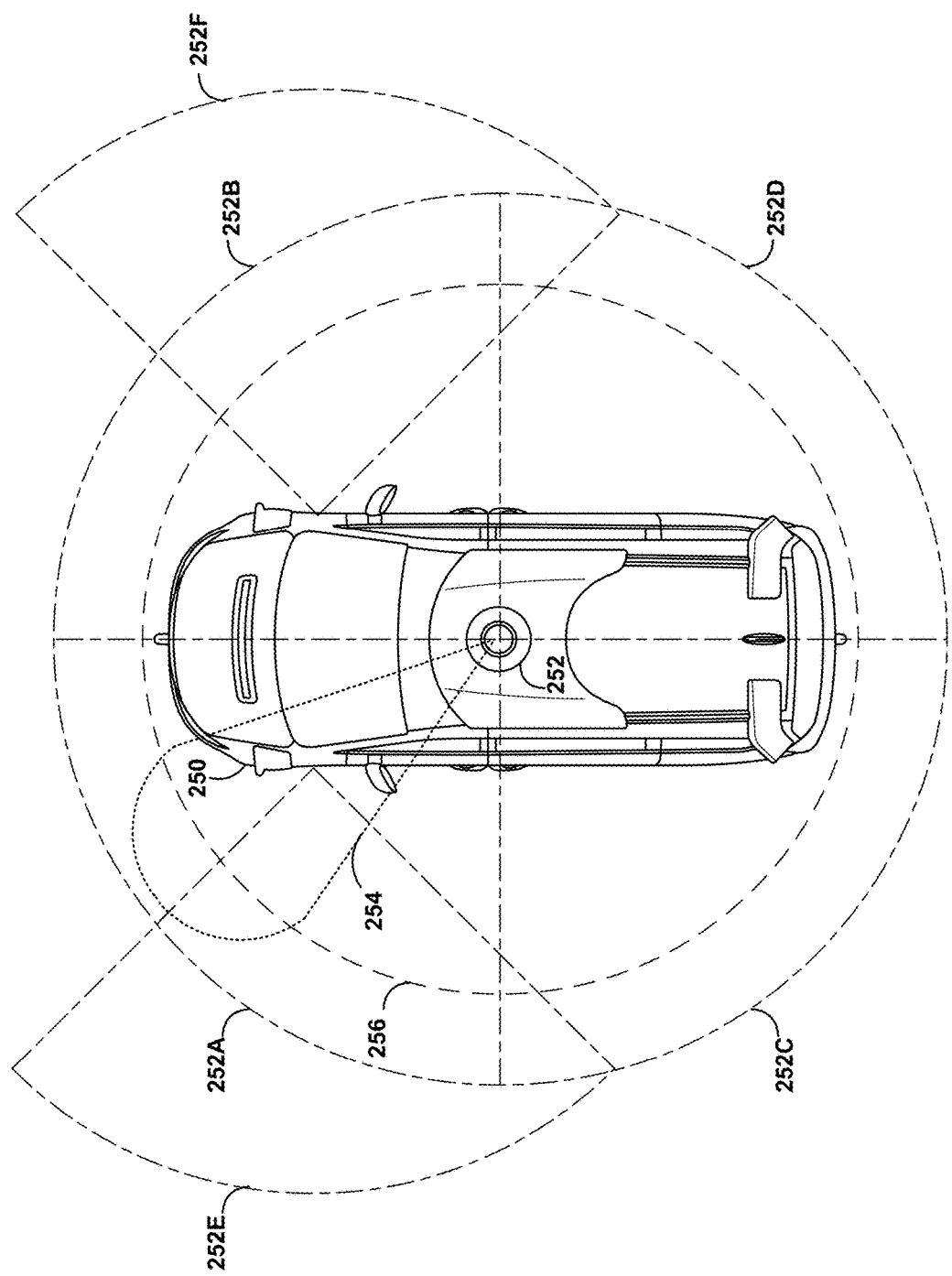
FIG. 2B depicts sensor fields of view of an example autonomous vehicle.

FIG. 2B illustrates an example autonomous vehicle 250 having various sensor fields of view. As previously discussed with respect to FIG. 2A, the vehicle 250 may contain a plurality of sensors. The locations of the various sensors may correspond to the locations of the sensors disclosed in FIG. 2A. However, in some instances, the sensors may have other locations. Sensors locations are omitted from FIG. 2B for simplicity of the drawing. For each sensor unit of vehicle 250, FIG. 2B shows a respective field of view. The field of view of a sensor may include an angular region over which the sensor may detect objects and a range that corresponds to maximum distance from the sensor at which the sensor may reliable detect objects.

The vehicle 250 may include six radar units. A first radar unit may be located on the front-left of the vehicle and have an angular field of view corresponding to the angular portion of field of view 252A. A second radar unit may be located on the front-right of the vehicle and have an angular field of view corresponding to the angular portion of field of view 252B. A third radar unit may be located on the rear-left of the vehicle and have an angular field of view corresponding to the angular portion of field of view 252C. A fourth radar unit may be located on the rear-right of the vehicle and have an angular field of view corresponding to the angular portion of field of view 252D. A fifth radar unit may be located on the left side of the vehicle and have an angular field of view corresponding to the angular portion of field of view 252E. A sixth radar unit may be located on the right side of the vehicle and have an angular field of view corresponding to the angular portion of field of view 252F. Each of the six radar units may be configured with a scannable beamwidth of 90 degrees. A radar beamwidth may be smaller than 90 degrees, but each radar unit may be able to steer the radar beam across the 90-degree field of view.

A first LIDAR unit of the vehicle 250 may be configured to scan the full 360-degree region around the vehicle as shown by an angular field of view corresponding to the angular portion of field of view 254. A second LIDAR unit of the vehicle 250 may be configured to scan a region smaller than the 360-degree region around the vehicle. In one example, the second LIDAR unit may have a field of view smaller than 10 degrees in the horizontal plant as shown by an angular field of view corresponding to the angular portion of field of view 254.

Additionally, the vehicle may also include at least one camera. The camera may be an optical camera and/or an infrared camera.

In addition to the field of view for each of the various sensors of vehicle 250, each sensor may also have a corresponding range. In one example, the range of the radar units may be greater than the range of either LIDAR unit, as shown by the field of the views of the radar units 252A-252E extending further than the fields of view for the LIDAR units 254 and 256. Additionally, the second LIDAR unit may have a range that is greater than a range of the first LIDAR unit, as shown by field of view 256 extending further than field of view 254. In various examples, the range of the camera may be greater than or less than the range of the other sensors.

Figure 3:
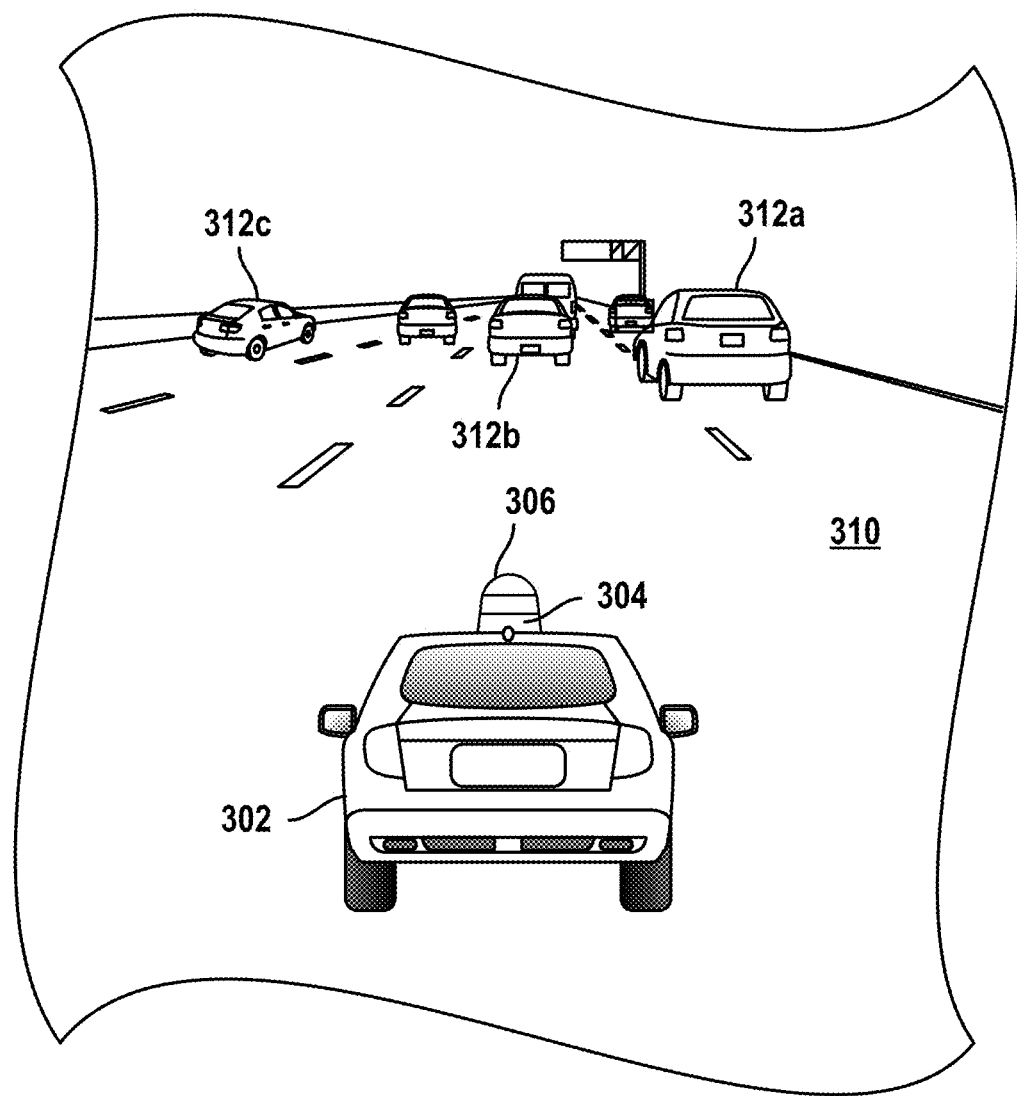
FIG. 3 illustrates a plurality of vehicles within an environment of a vehicle that includes a sensor, according to an example embodiment.

FIG. 3 illustrates a plurality of vehicles 312a-312c within an environment of a vehicle 302 that includes a sensor 306, according to an example embodiment. Although sensor 306 is shown on the roof of vehicle 302, it should be understood that sensor 306 may be located in the location(s) described with respect to FIG. 2B and have a field of view similar to that described with respect to FIG. 2B.

The vehicles 302 and 312a-c may be similar to the vehicles 100, 200, 302a-302d of FIGS. 1-3. For example, the vehicle 302 may include the sensor 306 (e.g., RADAR, LIDAR, etc.) similar to the radar unit 206 and/or the lidar unit 202 or 208 of the vehicle 200. Further, the vehicle 302 includes a mount 304 ("steering device") configured to adjust a direction of the sensor 306. The mount 304, for example, may be a moveable mount comprising materials suitable for supporting the sensor 306 and may be operated by a control system (not shown) to rotate the sensor 306 about a mount axis to modify the direction of the sensor 306. Alternatively, the mount 304 may modify the direction of the sensor 306 in a different manner. For example, the mount 304 (e.g., steering device) may translate the sensor 306 along a horizontal plane, etc.

As illustrated in FIG. 3, the vehicles 302 and 312a-312c are traveling on a road 310. The road 310 may have various objects located near the roadway that are not vehicles, such as buildings, embankments, walls, signs, etc. As the vehicle 302 operates on the roadway, it may use sensors to detect and determine locations for objects in the environment around the vehicle 302.

However, in some examples, the objects near the roadway may reflect signals transmitted by the sensors. These reflected signals may be received by the vehicle 302. The reflected signals may make one or more objects appear as if they exist in a position different from their actual position. Additionally, the reflections may also make the objects appear as if they are moving in different directions than they really are. Thus, it may be desirable to determine when reflections are present in a sensor system.

Figure 4:
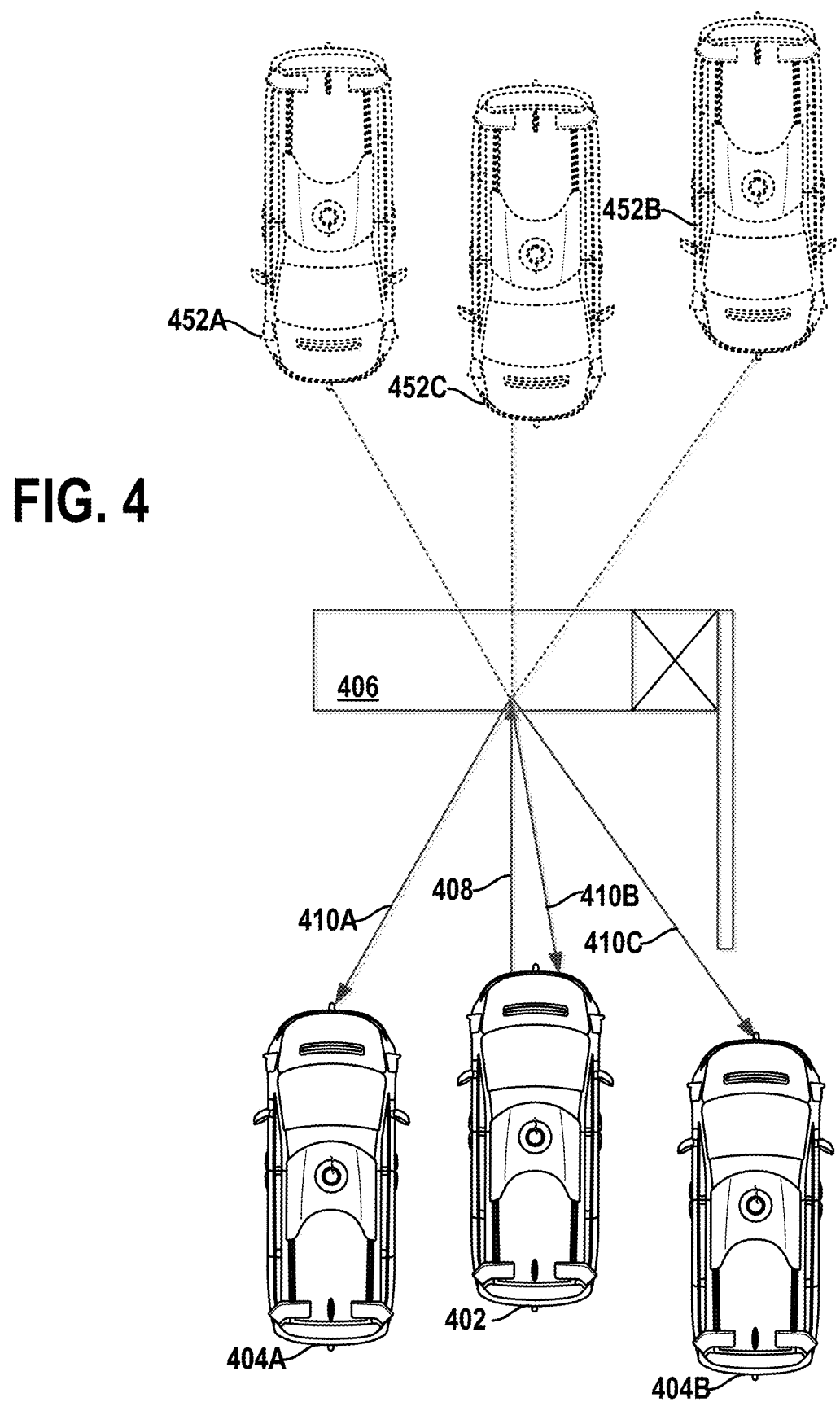
FIG. 4 illustrates example multibounce of a radar system.

FIG. 4 illustrates example multibounce of a radar system. As shown in FIG. 4, a first vehicle 402 may be operating on a roadway nearby two other vehicles 404A and 404B. The first vehicle 402 may be similar to the vehicles described with respect to FIGS. 1-3.

Similar to many highways and other types of roads, the roadway may include signs, such as the overhead sign 406. The first vehicle 402 may transmit a signal 408 by one of its sensors, such as a radar sensor. Upon leaving the first vehicle 402, the signal 408 may encounter and reflect off various objects in the environment, including overhead sign 406 prior to reception back at one or more sensors of the first vehicle 402. In some examples, a set of reflected signals received back by the first vehicle 402 may include one or more signals that engaged in a multibounce action prior to reaching the first vehicle 402 (e.g., a signal may reflect off: (i) the overhead sign 406, (ii) a vehicle (e.g., vehicles 402, 404A-404B), and (iii) back off the overhead sign 406 before reception at the first vehicle 402).

As indicated above, a signal that reflects off multiple surfaces in the environment prior to reaching the radar system (e.g., the overhead sign 406 and one or more vehicles) for processing may be called a multibounce (or multipath) signal. In some examples, a multibounce signal may be caused by other secondary reflectors in the environment, such as roadside objects, signs, and/or by vehicles themselves (such as a large semi-truck trailer). Processing one or more multibounce signals can cause the target objects that reflected the signals by way of the multibounce to appear to be located in an incorrect position. For example, the multibounce reflections may cause the vehicle 404A to appear at the location of the vehicle 452A, the vehicle 404B to appear at the location of the vehicle 452B, and/or the vehicle 402 to appear at the location of the vehicle 452C.

Thus, the reflected sensor signals may make it seem that vehicles 402, 404A, and 404B are driving toward vehicle 402 despite that the vehicles are all actually traveling in the same direction as shown in FIG. 4. In other examples, the virtual vehicle may be located in or appear to move in a direction other than towards the vehicle 402. Thus, it may be desirable to identify and mitigate the virtual vehicle that may appear in sensor data from multibounce.

Figure 5:
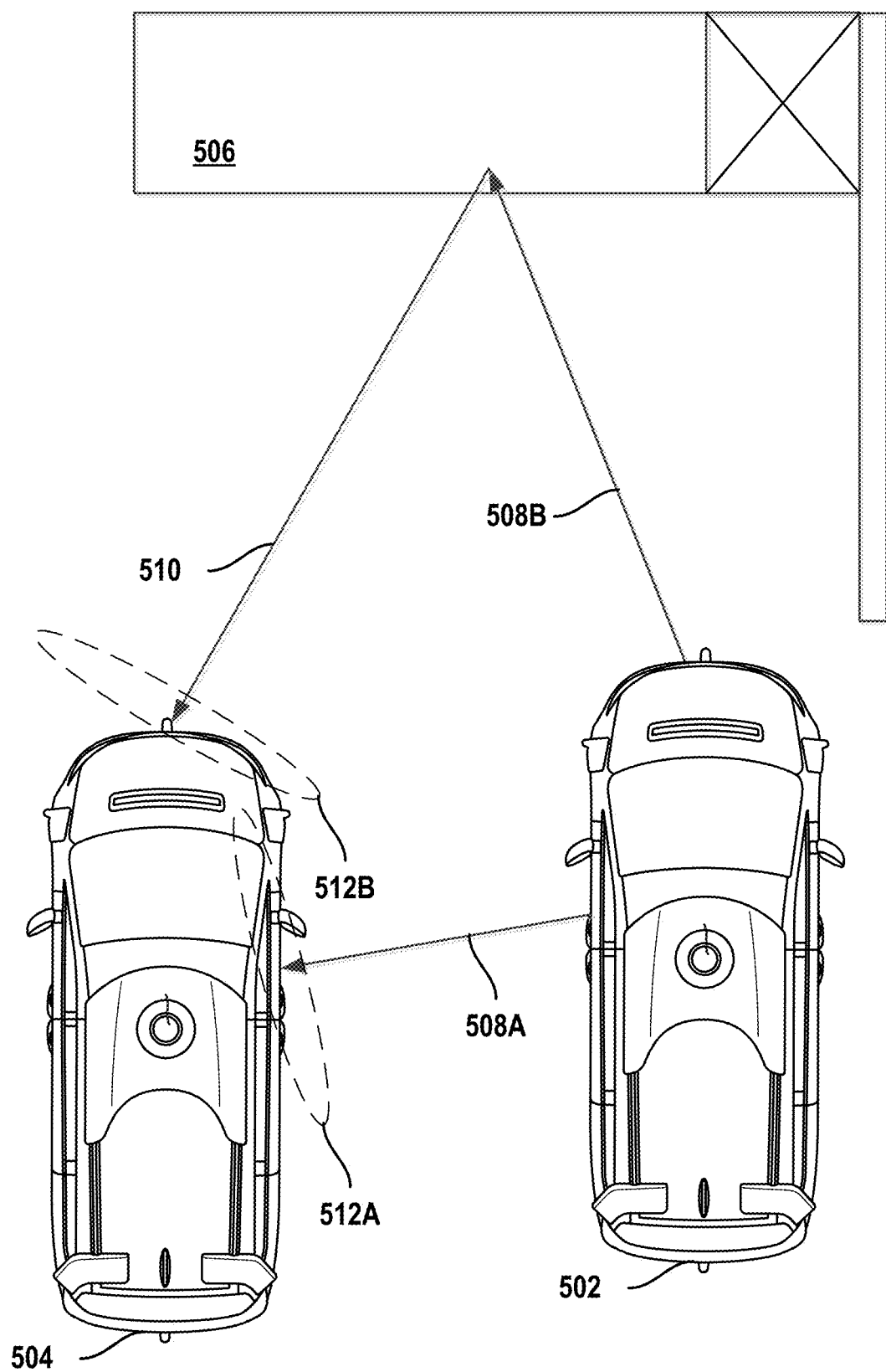
FIG. 5 illustrates example multibounce target information of a radar system.

FIG. 5 illustrates example multibounce target information of a radar system. As shown in FIG. 5, a vehicle 502 may include one or more sensor units, such as multiple radar sensors. The vehicle 502 may be operating in the vicinity of other vehicles (e.g., a vehicle 504) and other elements within a roadway environment (e.g., an overhead sign 506 or, any other secondary reflecting object). During the operation of the vehicle 504, the sensor system (e.g., a radar system) may transmit a first sensor signal 508A and a second sensor signal 508B. The first sensor signal 508A may reflect off the other vehicle 504 back to the sensor of the vehicle 502 as a primary reflection. The second sensor signal 508B may reflect off the overhead sign 506 as a reflected signal 510 then reflect off the other vehicle 504. Once the reflected signal 510 reflects from the other vehicle 508B, the reflected signal 510 may reflect off the overhead sign 506 again prior to reception by a sensor of the vehicle 502 as a secondary reflection (i.e., a reflection that bounced off a secondary reflecting object).

As previously discussed, some sensor systems, such as radar systems, may operate with high resolution in both Doppler and range, while having low resolution in azimuth (i.e., angular resolution). As shown in FIG. 5, ambiguity region 512A may be representative of the range, Doppler, and azimuth ambiguity of the primary reflection from transmitted signal 508A. Additionally, ambiguity region 512B may be representative of the range, Doppler, and azimuth ambiguity of the secondary reflection from transmitted signal 508B. Both ambiguity regions 512A and 512B represent the uncertainty in sensor measurements. As shown, both have a much larger azimuth extent due to the larger azimuth ambiguity of the sensor compared to range and doppler ambiguity.

However, because the vehicle 502 receives sensor data from two different angles of vehicle 504, a radar processing system of the vehicle 504 may be able to combine the sensor data of the two measurements to decrease the azimuth ambiguity 512A of the primary reflection 508B. Through the primary reflection from transmitted signal 508A and the secondary reflection from transmitted signal 508B, the same vehicle 504 may be imaged by the sensor system from another angle (i.e., from the direction by which the reflected radar signal hits the other vehicle). Conveniently, because the other vehicle 504 is being imaged from another direction, the low-resolution azimuth measurement of the primary sensor measurement may be supplemented with higher resolution range information from the secondary sensor measurement. Thus, the overall azimuth ambiguity of the secondary vehicle 504 may be reduced as the range measurement of the secondary reflection from transmitted signal 508B may be used to determine azimuth information that is more precise in the direction of the primary reflection from transmitted signal 508A.

Figure 6:
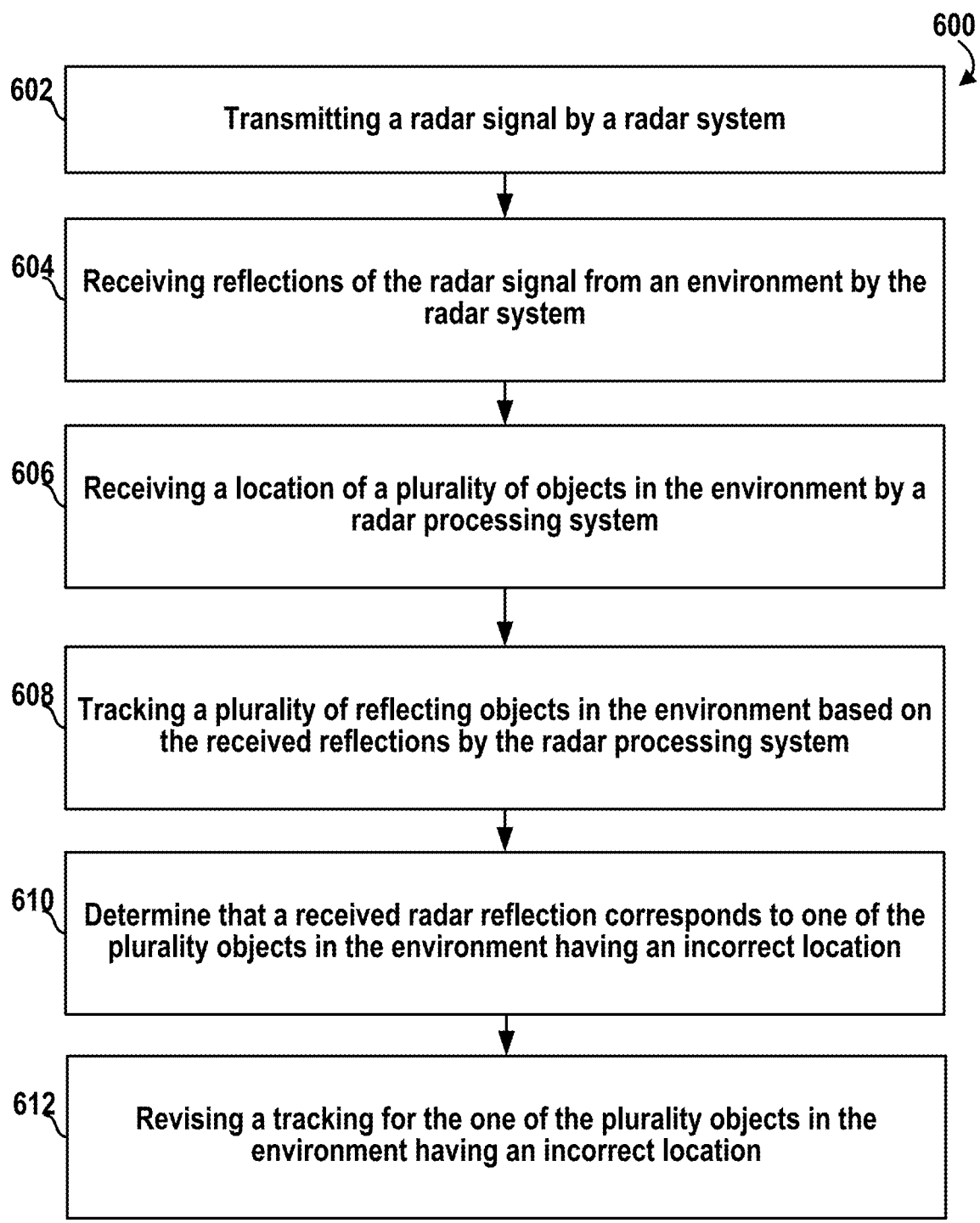
FIG. 6 illustrates an example method for use with multibounce of a radar system.

FIG. 6 illustrates an example method 600 for use with multibounce of a radar system, according to an example embodiment. Method 600 shown in FIG. 6 presents an embodiment of a method that could be used with one or more of the vehicles described with respect to FIGS. 1-5. Method 600 may include one or more operations, functions, or actions as illustrated by one or more of blocks 602-614. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

Figure 7:
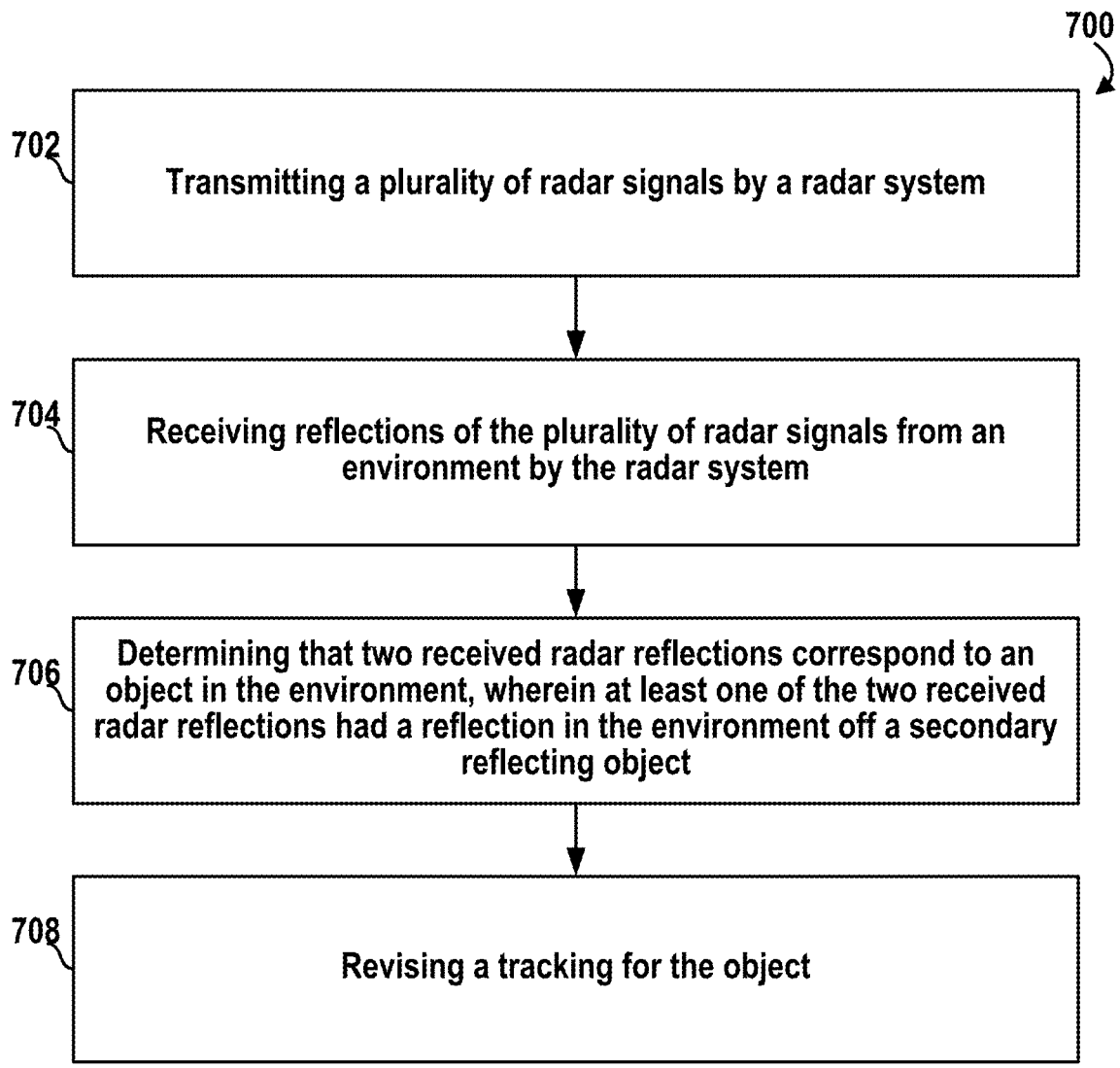
FIG. 7 illustrates an example method for use with multibounce to obtain target information of a radar system.

In addition, for both method 600 and method 700 shown in FIG. 7 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor, such as a processor of a radar processing system, for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 600 and other processes and methods disclosed herein, each block in FIG. 6 may represent circuitry that is wired to perform the specific logical functions in the process, for example.

At block 602, the method 600 includes transmitting a radar signal by a radar system. The radar system may operate by transmitting a series of radar pulses into the surrounding environment of the vehicle. A vehicle may include a radar system that includes one or more radar units. In some examples, a vehicle may have one radar unit. In other examples, a vehicle may include several radar units, each having a respective orientation. A radar unit may include a radar antenna and radar hardware, such as signal generators, signal processors, digital to analog (D to A) converters, and analog to digital (A to D) converters. The radar units may be configured to transmit radar signals into the environment of the vehicle. In some examples, each radar unit may be coupled to a radar processor. The radar processor may control the signals transmitted by a respective radar unit. The radar unit may use one or more antennas to transmit the radar signal. For example, the radar processor may be in communication with one or more radar units. The radar processor may send signals to each radar unit instructing it to transmit radar signals.

At block 604, the method 600 includes receiving reflections of the radar signal from an environment by the radar system. Once a radar signal is transmitted at block 602, the radar unit may use an antenna to receive radar reflection signals reflected back to the radar unit from the environment of the vehicle. At block 604, the radar system may receive radar reflections for each of the transmitted radar pulses. The radar unit may use at least one antenna to receive the radar signals. In some examples, the radar unit may use the same antennas that transmitted at block 602. In other examples, the radar unit may use different antennas than the transmission antennas.

When radar signals are received by the antennas, they may be converted from an analog signal into a digital signal. The digital signal may be communicated to the radar processor. In some other examples, the radar processor may receive analog signals instead of digital signals. The radar processor may use the received signals to determine the parameters of the objects that reflected the radar signals. The radar processor may determine a range to reflecting objects, a doppler shift of the reflecting objects, and an azimuth extent of the objects. Additionally, the radar processor may determine a location and a movement of the reflecting objects.

At block 606, the method 600 includes receiving a location of a plurality of objects in the environment by a radar processing system. The radar processing system may receive an input of locations of a plurality of objects in the environment of the vehicle. In some examples, receiving a location of a plurality of objects in the environment includes receiving object data from a sensor. For example, the locations may be determined based on data from optical cameras, infrared cameras, LIDAR, or other sensors. In another example, receiving a location of a plurality of objects in the environment comprises receiving object data from map data stored in a memory.

The map data may be pre-stored in a memory of the vehicle. In some examples, the map data may be received by the vehicle from a remote computing system. The objects in the map data may be provided by the remote server as well. In other examples, the processing system of the vehicle may locate the objects with respective locations in the map data based on sensor data collected by the vehicle. For example, the map data may include some objects, such as static location objects that may be in the environment of the vehicle. The sensor system of the vehicle may be able to supplement the map data and add locations of other objects (e.g., pedestrians and other vehicles) to the map data. In some examples, the sensor-supplemented map data may be objects that do not have a fixed location in the environment of the vehicle.

In some other examples, the method 600 may omit block 606. In these examples, the system may function exclusively based on the radar data that the vehicle receives.

At block 608, the method 600 includes tracking a plurality of reflecting objects in the environment based on the received reflections by the radar processing system. Based on the received radar signals, the radar processing system may track a plurality of objects that produce radar reflection. By tracking objects, the radar system may determine a location and movement (e.g., range, doppler, and azimuth extent) of the various objects that caused radar reflections. With each subsequent received radar pulse, the radar system may update the location information. Thus, through a series of received radar pulses, the radar system may be able to revise the location information and track the relative locations of the various reflectors.

In some examples, at block 608, a processor of the vehicle, such as the radar processor or another processor, may associate the tracked reflecting objects with various known objects. Thus, the tracking may include a processor associating the radar reflection signals with known objects in the map data.

At block 610, the method 600 includes determining, by the radar processing system, that a received radar reflection corresponds to one of the plurality objects in the environment having an incorrect location. In one example, the system may flag tracked objects that do not correspond with objects in the map data. For example, one radar reflection may correspond to the location of another vehicle in the map data (e.g., another vehicle that was located based on data from other sensors). A radar reflection that corresponds with a known object may not be flagged. However, another radar reflection may correspond to the location that is not known or expected to have any objects. A radar reflection that corresponds with no known objects may be flagged. The system may perform an analysis on the flagged objects to determine if the flagged objects are actual objects in the environment or if they are virtual objects caused by radar multibounce.

In some examples, block 610 may include determining a secondary reflecting object that caused the incorrect location. At block 610, the processor may determine that a potential secondary reflecting object is located in the environment of the vehicle. For example, this secondary reflecting object may be an overhead road sign that is identified in the map data. In another example, the radar processing system may be able to identify a secondary reflecting object based on received radar reflections (as the secondary reflecting object may also act as a primary reflecting object and directly reflect radar signals back to the vehicle that transmitted the radar signals).

Based on the identification of a secondary reflecting object, the system may determine if the secondary reflecting object may cause virtual objects to appear based on the position of the vehicle, the position of the secondary reflecting object, and the position of known objects. For example, as seen in FIG. 4, the secondary reflecting object causes virtual objects for each of the three vehicles. Thus, the system may know the positions of the three vehicles based on map data and other sensor data. The system may have flagged the three virtual vehicles as not being associated with known objects. The system may then use an algorithm, such as ray tracing or another algorithm, to determine if the location of the virtual object corresponds to an expected location of the virtual object based on the locations of the position of the vehicle, the position of the secondary reflecting object, and the position of known vehicles. If the location corresponds, the system may determine that the virtual objects have incorrect locations identified.

Additionally, at block 610, the vehicle may communicate information related to the secondary reflecting object to a remote computing system. For example, the vehicle may send data to the remote computing system so that the remote computing system may update global map data (i.e., map data provided to all vehicles) so that other vehicles may be able to more easily identify the secondary reflecting object.

At block 612, the method 600 includes revising a tracking for the one of the plurality of objects in the environment having an incorrect location. In response to the system determining that a tracked object has an incorrect location, the system may revise the tracking. In some examples, the system may revise the tracking by stopping tracking an object with an incorrect location.

It may be desirable to stop tracking an object when it is determined that the tracked object is not a real object, such as a false radar return. It may also be desirable to stop tracking an object when the tracked object is determined to be a virtual object that corresponds to another already-tracked object. For instance, an object may already be tracked with either radar or some other sensor. When the object with the incorrect location is determined to be the same object, the track may be stopped so that the true location of the object will be tracked.

In another example, revising the tracking may include revising a location of the one of the plurality objects in the environment having an incorrect location. In some instances, the system may determine a correct location for the object that was initially tracked with the incorrect location. Thus, the system may revise a location of the object and continue tracking it. For example, when an object is initially tracked is a virtual object based on reflected signals, the system may determine the object's correct location (such as by way of ray tracing, as previously described) and continue to track the object at the correct location. Additionally, revising the tracking may also include revising a movement direction of one of the plurality objects in the environment having an incorrect location. For example, the system may determine a true direction of travel and revise the tracking to include both the correct location and the correct direction of travel, such as in similar manners used to determine the true location. For example, based on the reflections caused by the secondary reflector, the system may be able to determine a true direction of travel for the objects having an incorrect location.

FIG. 7 illustrates an example method 700 for use with multibounce to obtain target information of a radar system. At block 702, the method 700 includes transmitting a radar signal by a radar system. As previously discussed, the radar system may operate by transmitting a series of radar pulses into the environment of the vehicle. A vehicle may include a radar system that includes one or more radar units. At block 702 each radar unit, or a subset of radar units, may transmit a series of radar pulses. In other examples, a vehicle may include several radar units, each having a respective orientation. A radar unit may include a radar antenna and radar hardware, such as signal generators, signal processors, digital to analog (D to A) converters, and analog to digital (A to D) converters. The radar units may be configured to transmit radar signals into the environment of the vehicle. In some examples, each radar unit may be coupled to a radar processor. The radar processor may control the signals transmitted by a respective radar unit. The radar unit may use one or more antennas to transmit the radar signal. For example, the radar processor may be in communication with one or more radar units. The radar processor may send signals to each radar unit instructing it to transmit radar signals.

At block 704, the method 700 includes receiving reflections of the plurality of radar signals from an environment by the radar system. Once a radar signal signal is transmitted at block 702, the radar unit may use an antenna to receive radar reflection signals reflected back to the radar unit from the environment of the vehicle. At block 704, the radar system may receive radar reflections for each of the transmitted radar pulses. The radar unit may use at least one antenna to receive the radar signals.

In some examples, the radar unit may use the same antennas that transmitted at block 702. In other examples, the radar unit may use different antennas than the transmission antennas. Additionally, in some examples, a respective radar unit may receive radar reflections corresponding to reflections of the radar signals transmitted by that radar unit. Thus, each radar unit may operate to transmit and receive independent of each other radar unit. In other examples, a radar unit may receive radar signals that are transmitted by a different radar unit.

When radar signals are received by the antennas, they may be converted from an analog signal into a digital signal.

The digital signal may be communicated to the radar processor. In some other examples, the radar processor may receive analog signals instead of digital signals. The radar processor may use the received signals to determine the parameters of the objects that reflected the radar signals. The radar processor may determine a range to reflecting objects, a doppler shift of the reflecting objects, and an azimuth extent of the objects. Additionally, the radar processor may determine a location and a movement of the reflecting objects.

Additionally, in some examples, a first radar reflection of the two radar reflections is received by a first radar unit of the radar system and a second radar reflection of the two radar reflections is received by a second radar unit of the radar system. Thus, the two radar units may each send and receive signals based on their respective fields of view. However, a secondary reflecting object may cause a radar unit to have a skewed field of view and the secondary reflecting object causes radar signals to reflect in a direction other than the transmitted direction. In some other examples, one radar unit may receive both a primary reflection signal and a secondary reflection signal.

For each of the two received radar reflections the system may determine a doppler, azimuth extent, and range for the reflections. Doppler is a measure of the motion of the object in a direction normal to the direction of the radar reflection. Azimuth extent is the angular width of the object. Range is the distance to the reflecting object, measured along the path of the radar signal (including any secondary reflections). As previously discussed, some radar systems may have a relatively high precision for range and doppler and a relatively low precision for azimuth. In practice, this means a radar system may accurately be able to measure the distance to and the normal-directed motion of a reflecting object. However, the azimuth resolution may be lower leading to a less accurate measure of the angular width of an object. The present disclosure uses a multibounce radar signal to increase the azimuth accuracy.

Additionally at block 704 (and/or at block 706), the system may determine a primary reflection of the two received radar reflections and a secondary reflection of the two received radar reflections. A primary reflection is a reflection signal that only reflects once. For example, a radar unit may transmit a radar signal that reflects off another vehicle before being received by the radar unit as a primary reflection. A secondary reflection is a reflection signal that has reflected more than once before being received. For example, a radar unit may transmit a radar signal that reflects off a secondary reflector before reflecting off another vehicle before being received by the radar unit as a primary reflection. In some examples, the secondary reflection may reflect off the secondary reflector before reflecting off the target object, after reflecting off the target object, or both before and after reflecting off the target object.

At block 706, the method 700 includes determining, by the radar processing system, that two received radar reflections correspond to an object in the environment, wherein at least one of the two received radar reflections had a reflection in the environment off a secondary reflecting object. In some examples, block 706 may also perform the functions of block 606-610 of method 600 to receive the location of known objects in the environment of the vehicle, determine object's locations, and determine secondary reflecting objects.

Based on the received radar signals, the radar processing system may track a plurality of objects that produce radar reflection. By tracking objects, the radar system may determine a location and movement (e.g., range, doppler, and azimuth extent) of the various objects that caused radar reflections. With each subsequent received radar pulse, the radar system may update the location information. Thus, through a series of received radar pulses, the radar system may be able to revise the location information and track the relative locations of the various reflectors.

In some examples, at block 706, a processor of the vehicle, such as the radar processor or another processor, may associate the tracked reflecting objects with various known objects. Thus, the tracking may include a processor associating the radar reflection signals with known objects in the map data. The radar system may perform an analysis, such as by raytracing or another algorithm, to determine two radar reflections that correspond to a single object. In some cases, one of the radar reflections may be a primary reflection and the other may be a secondary reflection. In another case, both radar reflections may be secondary reflections.

In some examples, block 706 may include determining a secondary reflecting object that caused the incorrect location. At block 706, the processor may determine that a potential secondary reflecting object is located in the environment of the vehicle. For example, this secondary reflecting object may be an overhead road sign that is identified in the map data. In another example, the radar processing system may be able to identify a secondary reflecting object based on received radar reflections (as the secondary reflecting object may also act as a primary reflecting object and directly reflect radar signals back to the vehicle that transmitted the radar signals). Additionally, at block 706, the system may communicate information about the secondary reflecting object to a remote computing system. For example, the vehicle may send data to the remote computing system so that the remote computing system may update global map data (i.e., map data provided to all vehicles) so that other vehicles may be able to more easily identify the secondary reflecting object.

At block 708, the method 700 includes revising a tracking for the object. In response to the system determining that two radar reflections correspond to a single tracked object, the system may revise the tracking. In some examples, the system may revising the tracking by revising a location of the object. In some additional examples, the system may revising the tracking by revising an azimuth extent for the object based on at least one of the doppler, azimuth extent, and range for the secondary reflection.

As shown in FIG. 5, the two radar reflections (shown in FIG. 5 as a primary reflection and a secondary reflection) are created by another object. The extent of the azimuth ambiguity is in a different direction for each of the two azimuth extents. Thus, using the range measurement (and possibly the doppler measurement) of the secondary reflection, the system may be able to accurately locate the vehicle along the path of the secondary radar reflection. Further, because there is a component of the secondary reflection that is orthogonal to the primary reflection, this range information may supplement the azimuth information of the primary reflection. By supplementing the lower accuracy azimuth information for the primary reflection with higher accuracy range information from the secondary reflection, the system may be able to revise the azimuth information for the primary reflection. Thus, the system may revise the target information for the object that caused the two reflections based on the azimuth information that has been revised based on the information from the secondary reflection.

Although methods 600 and 700 are described as separate methods, in some examples, various features of the two methods may be combined. For example, block 708 of method 700 may be performed at block 612 of method 600. Other examples are possible as well. Moreover, both methods 600 and 700 may contain another block that includes controlling a vehicle based on the revised target information. Because both methods 600 and 700 included revising information about radar signals, each method may provide more accurate information about the environment of the vehicle. Therefore, each method may also include controlling the vehicle, such as in an autonomous drive mode, based on either blocks 602-612 and/or blocks 702-708.

Figure 8:
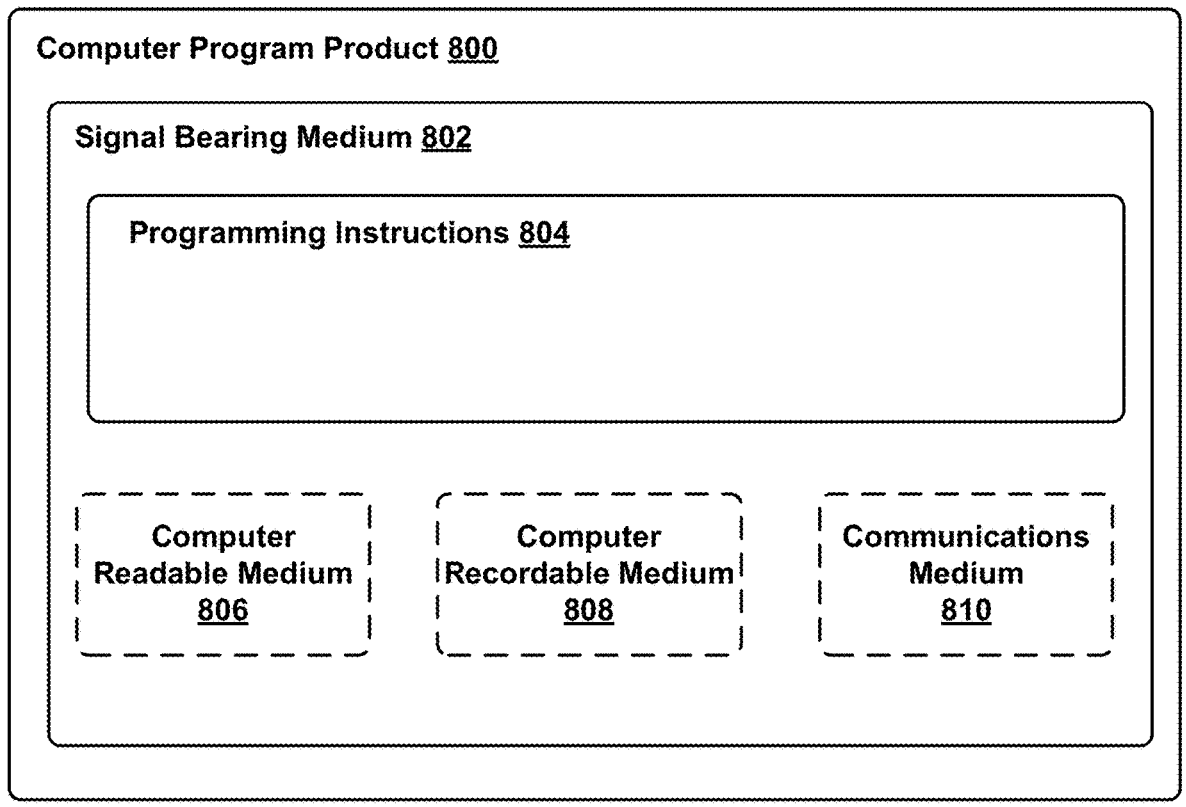
FIG. 8 depicts an example computer readable medium configured according to an example embodiment.

FIG. 8 depicts an example computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., methods 400, etc.) may be implemented by computer program instructions encoded on a computer readable storage media in a machine-readable format, or on other media or articles of manufacture (e.g., instructions 216 of the vehicle 200, instructions 312 of the computing device 304, etc.). FIG. 8 is a schematic illustrating a conceptual partial view of an example computer program product that includes a computer program for executing a computer process on a computing device, such as on a radar planning system, arranged according to at least some embodiments disclosed herein.

In one embodiment, the example computer program product 800 is provided using a signal bearing medium 802. The signal bearing medium 802 may include one or more programming instructions 804 that, when executed by one or more processors may provide functionality or portions of the functionality described above with respect to FIGS. 1-9. In some examples, the signal bearing medium 802 may be a computer-readable medium 806, such as, but not limited to, a hard disk drive, a Compact Disc (CD), a Digital Video Disk (DVD), a digital tape, memory, etc. In some implementations, the signal bearing medium 802 may be a computer recordable medium 808, such as, but not limited to, memory, read/write (R/W) CDs, R/W DVDs, etc. In some implementations, the signal bearing medium 802 may be a communication medium 810 (e.g., a fiber optic cable, a waveguide, a wired communications link, etc.). Thus, for example, the signal bearing medium 802 may be conveyed by a wireless form of the communications medium 810.

The one or more programming instructions 804 may be, for example, computer executable and/or logic implemented instructions. In some examples, a computing device may be configured to provide various operations, functions, or actions in response to the programming instructions 804 conveyed to the computing device by one or more of the computer readable medium 806, the computer recordable medium 808, and/or the communications medium 810.

The computer readable medium 806 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server, or a distributed cloud computing network.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method comprising:
   transmitting a radar signal by a radar system coupled to a vehicle, wherein the radar system includes a radar processing system and one or more radar units;
   receiving reflections of the radar signal from an environment by the radar system;
   receiving, from two or more sources, respective locations for a plurality of objects located in the environment by the radar processing system, wherein the two or more sources includes a map of the environment and a sensor communicatively coupled to the radar processing system, and wherein the sensor is coupled to the vehicle and differs from the one or more radar units;
   tracking a plurality of reflecting objects in the environment based on the received reflections by the radar processing system;
   determining, by the radar processing system, that a received radar reflection indicates that a given object of the plurality of objects is positioned at a location that differs from the respective location of the given object as conveyed by at least one source of the two or more sources; and
   revising a tracking for the given object based on the respective location of the given object as conveyed by the at least one source of the two or more sources.

2. The method of claim 1, wherein revising the tracking comprises stopping tracking.

3. The method of claim 1, wherein revising the tracking comprises revising a location of the given object based on the respective location of the given object as conveyed by the at least one source of the two or more sources.

4. The method of claim 3, wherein revising the tracking comprises revising a movement direction of the given object.

5. The method of claim 1, wherein receiving respective locations for the plurality of objects located in the environment comprises receiving object data from the sensor.

6. The method of claim 1, wherein receiving respective locations for the plurality of objects in the environment comprises receiving object data from map data stored in a memory located on the vehicle.

7. The method of claim 1, further comprising determining a secondary reflecting object that caused the given object to appear at an incorrect location relative to the respective location of the given object as conveyed by at least one source of the two or more sources.

8. The method of claim 1, further comprising communicating the secondary reflecting object to a remote computing system.

9. A radar system comprising:
a radar unit coupled to a vehicle and configured to:
   transmit a radar signal, and
   receive radar reflections,
a memory configured to store data related to an environment; and
a radar processing system configured to:
   receive, from two or more sources, respective locations for a plurality of objects located in the environment, wherein the two or more sources includes a map of the environment and a sensor communicatively coupled to the radar processing system, and wherein the sensor is coupled to the vehicle and differs from the radar unit;
   track a plurality of reflecting objects in the environment based on the received radar reflections,
   determine that a received radar reflection indicates that a given object of the plurality of objects is positioned at a location that differs from the respective location of the given object as conveyed by at least one source of the two or more sources, and
   revise a tracking for the given object based on the respective location of the given object as conveyed by the at least one source of the two or more sources.

10. The radar system of claim 9, further comprising a communication system configured to receive object data from map data stored in a memory.

11. The radar system of claim 9, further comprising a communication system configured to receive object data from the sensor.

12. The radar system of claim 9, wherein the radar processing system is further configured to revise the tracking by revising a location of the given object based on the respective location of the given object as conveyed by the at least one source of the two or more sources.

13. A non-transitory computer readable medium having stored thereon executable instructions that, upon execution by a computing device, cause the computing device to perform functions comprising:
   transmitting a radar signal by a radar system coupled to a vehicle, wherein the radar system includes a radar processing system and one or more radar units;
   receiving reflections of the radar signal from an environment by the radar system;
   receiving, from two or more sources, respective locations for a plurality of objects located in the environment, wherein the two or more sources includes a map of the environment and a sensor communicatively coupled to the radar processing system, and wherein the sensor is coupled to the vehicle and differs from the one or more radar units;
   tracking a plurality of reflecting objects in the environment based on the received reflections by the radar processing system;
   determining that a received radar reflection indicates that a given object of the plurality of objects is positioned at a location that differs from the respective location of the given object as conveyed by at least one source of the two or more sources; and
   revising a tracking for the given object based on the respective location of the given object as conveyed by the at least one source of the two or more sources.

14. The non-transitory computer readable medium of claim 13, wherein revising the tracking further comprises instructions for stopping tracking.

15. The non-transitory computer readable medium of claim 13, wherein revising the tracking further comprises instructions for revising a location of the given object as conveyed by the at least one source of the two or more sources.

16. The non-transitory computer readable medium of claim 15, wherein revising the tracking further comprises instructions for revising a movement direction of the given object.

17. The non-transitory computer readable medium of claim 13, wherein receiving respective locations for the plurality of objects located in the environment further comprises instructions for receiving object data from the sensor.

18. The non-transitory computer readable medium of claim 13, wherein receiving respective locations for the plurality of objects located in the environment further comprises instructions for receiving object data from map data stored in a memory.

19. The non-transitory computer readable medium of claim 13, further comprising instructions for determining a secondary reflecting object that caused the given object to appear at an incorrect location relative to the respective location of the given object as conveyed by at least one source of the two or more sources.

20. The non-transitory computer readable medium of claim 13, further comprising instructions for communicating the secondary reflecting object to a remote computing system.

* * * * *